W. D. LEAVITT.
Corn Sheller.
No. 93,455. Patented Aug. 10, 1869.
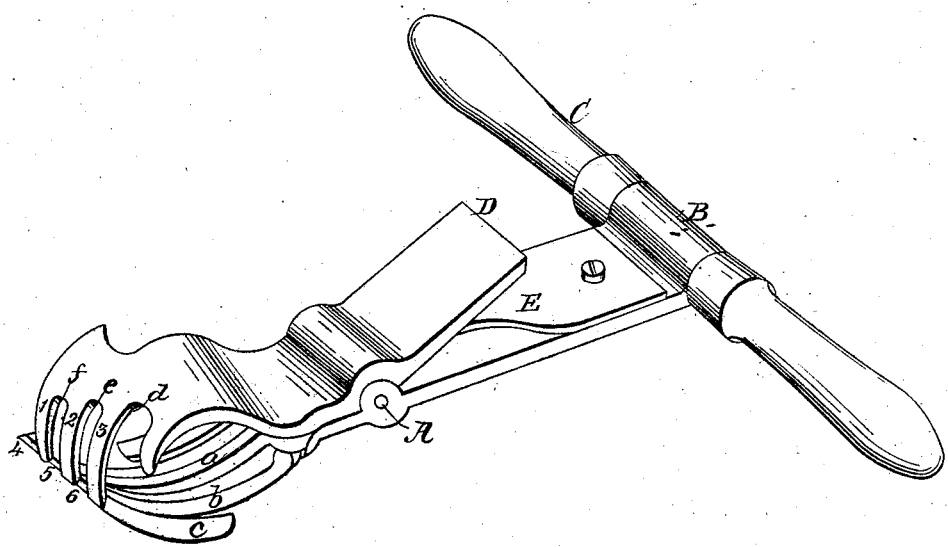
Witnesses
W H Lillie
H. N. Jenkins
Inventor
W D Leavitt

United States Patent Office.

WILLIAM D. LEAVITT, OF NEW ORLEANS, LOUISIANA.

Letters Patent No. 93,455, dated August 10, 1869.

IMPROVEMENT IN CORN-SHELLER.

The Schedule referred to in these Letters Patent and making part of the same.

*To all whom it may concern:*

Be it known that I, WILLIAM D. LEAVITT, of New Orleans, in the State of Louisiana, have invented a certain new and useful Improvement in Corn-Shellers; and I do hereby declare the following to be a full, clear, and exact description of the same, reference being had to the annexed drawing, making a part of this specification, whereon it is shown clearly by a perspective view.

My invention is a hand-machine that operates substantially on the same general principles as Michael Housman's improvement, patented September 4, 1860, and Michael and Simeon Housman's improvement, patented December 11, 1866, but it is differently formed and constructed, alike in its separate parts and as a whole, and completely remedies all the objectionable characteristics or defects of both said improvements, and creates an organism that is more effective in practice, less liable to get out of order, and which can be manufactured at far greatly diminished cost.

The defects to which I refer as belonging to the Housman machines, are,

First, that the two jaws, which, spreading out at their extremities into curvilinear "shells," as the Housmans call them, with their concave surfaces that face each other, establish an elliptical opening, through which, ear by ear, the corn is passed and shelled, are jointed on the handle, which thus becomes the axis on which they articulate at their other extremities, and hence, it being impossible to make the contact-surfaces smooth, there is such very rapid wear of the parts, that the machine, at that point, quickly yields or breaks. I remedy this defect by placing the axis, on which the jaws vibrate, midway, or thereabout, between the handle and the expanded shell-formed extremities of the two jaws, as shown at A on the drawing, and, by connecting the handle to the lower jaw only, by means of a circular or sleeve-termination of the same, as shown at B, in which the handle C is inserted in such manner as to fit snugly, whilst easily rotating therein.

The second defect in the Housman improvements is, that there are no means in them for opening the jaws, except by inserting the fingers between them, and pulling them apart, so that when an ear of corn happens to be too large to be introduced in the shelling-aperture without an enlargement of the same, by opening the jaws, there is always more or less trouble and delay before this can be done. This defect I remedy by cutting off, or, more properly speaking, making shorter the arm of the upper jaw, as shown at D, for I thus provide a means by which the jaws may be opened by a simple pressure of the thumb or finger thereupon, which is just sufficient to overcome the tensile force of the spring E, and am hence enabled to enlarge the opening between the shells with all possible ease and dispatch, and so introduce any-sized ear of corn that may present itself.

A further defect of the Housman machines is, that there are no lateral openings, but an unbroken continuity of metal in the expanded ends of the jaws, between which the ears of corn pass to be shelled, through which the grains of corn, as they are stripped from the cob, can escape, which frequently causes an accumulation and packing of the same, to such an extent as to force the jaws so wide apart, that a part of the ear passes through the machine without being shelled. I avoid this objectionable consequence by terminating the "shells" with a series of fingers, 1, 2, 3, 4, 5, 6 as shown, the same being extensions of the ribs or flanches *a b c d e f*, which, projecting from the interior surfaces of said "shells" in oblique and slightly-curvilinear lines, may be said to represent heavy threads of a female screw, when the two shells are united, and to constitute the means for drawing an ear of corn through the same, and, at the same time, of shelling it. The open spaces between the fingers provide avenues for the lateral escape of a considerable portion of the grains of corn as the ear is being shelled, and hence no undue accumulation, nor consequent packing of the same, can ever by possibility happen, nor any part of the ear pass through the machine without being shelled.

Still another defect characterizing the Housman machine is, that when an ear of corn is large enough to force the ends of the "shells" apart, there is a break in the continuity of the circle of projecting flanches, which checks the progress of the ear of corn through the machine, whereas, the fingers, which terminate the shells in my machine, being so disposed as to interlock or pass respectively between each other, when the jaws are closed, as is clearly shown, this difficulty can never occur, however the ears of corn may vary in size.

Finally, the spring E is a decided improvement, as compared either with the enveloping spring found in Michael Housman's patent of 1860, or the duplex spiral spring employed in Michael and Simeon Housman's improvement, patented in 1866, for it is less costly, less liable to get out of order, and far more easily applied and renewed if it be broken, than either of the former.

In the use or practice of my machine, the handle is held in the right hand of the operator, while the ear of corn is inserted in the elliptical opening, between the expanded terminations of the jaws, and then the machine is rapidly turned around until the cob passes through, the turning being for half the length of the ear with the right hand, and for the residue of its length by the left hand, the ear being held first by the left and then by the right, as the hands are shifted on the handle.

If an ear be too large to enter readily without expanding the opening between the jaws, a pressure of the thumb on the end D of the upper jaw instantly effects this object.

Having thus described my invention,

What I claim, and desire to secure by Letters Patent, is—

1. Terminating the shells by a series of fingers, 1, 2, 3, 4, 5, 6, and so disposing these fingers, as that they shall pass between and interlock each other, substantially as shown and described, for the purpose set forth.

2. The combination of the shells A, when they terminate in fingers 1, 2, 3, 4, 5, 6, with a short upper jaw, D, and a flat spring, E, substantially as described, for the purpose set forth.

W. D. LEAVITT.

Witnesses:
W. H. LILLIE,
H. N. JENKINS.